UNITED STATES PATENT OFFICE.

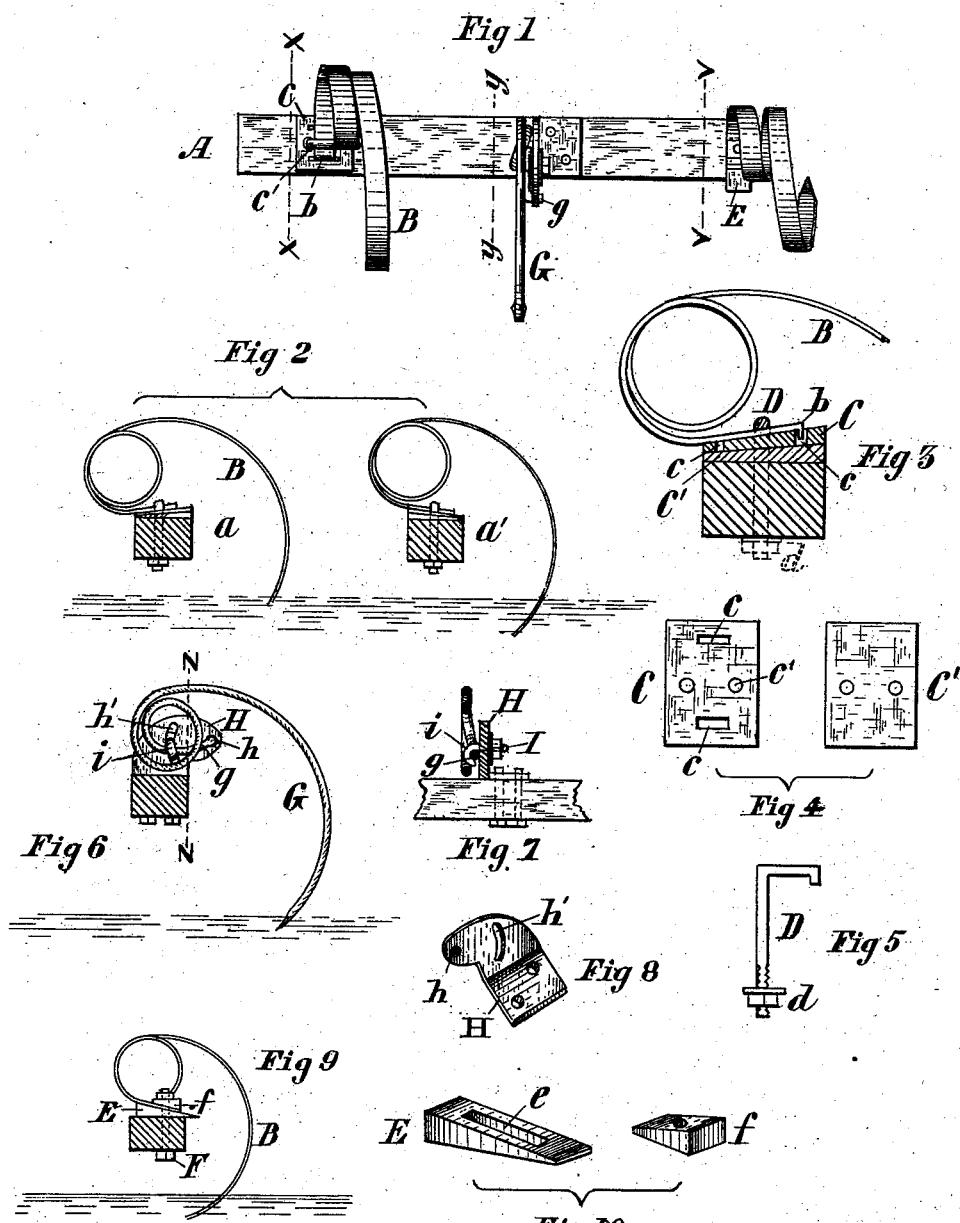

SAMUEL C. COBB, OF JANESVILLE, WISCONSIN, ASSIGNOR TO JAMES B. CROSBY, OF SAME PLACE.

HARROW-TOOTH ATTACHMENT.

SPECIFICATION forming part of Letters Patent No. 224,275, dated February 10, 1880.

Application filed December 21, 1878.

*To all whom it may concern:*

Be it known that I, SAMUEL C. COBB, of Janesville, in the county of Rock and State of Wisconsin, have invented a new and useful Improvement in Harrow-Tooth Attachments, which is fully described in the following specification, reference being had to the accompanying drawings, in which—

Figure 1 represents a plan view of a tooth-bar of a harrow with teeth attached thereto in accordance with my improvement; Fig. 2, a transverse section of the same taken on the line $x\ x$, Fig. 1, and showing the tooth under two different adjustments; Fig. 3, a similar view of the attachment on an enlarged scale; Fig. 4, a plan view of the wedge-shaped adjusting-plates; Fig. 5, a similar view of the fastening hook or staple; Fig. 6, a transverse section taken on the line $y\ y$, Fig. 1, showing a modification in the device for attaching the tooth to the bar; Fig. 7, a section of the same taken on the line N N, Fig. 6; Fig. 8, a perspective view of the tooth-bracket detached; Fig. 9, a transverse section taken on the line $v\ v$, Fig. 1, showing a modification in the attachment with adjusting-plates; Fig. 10, a perspective view of the wedge-shaped adjusting-plates changed slightly in construction.

My invention relates to harrows in which elastic teeth are used; and its object is to provide for the attachment of such teeth to the bar so as to be readily adjusted longitudinally to raise and lower and change the pitch of the teeth, or detached from the bar, whenever occasion requires.

The present improvement consists in curved elastic teeth attached to the tooth-bars at their upper extremities by a joint which permits the teeth to be vibrated, in combination with a fastening device operating to secure the teeth rigidly in position, whereby a tooth may be adjusted in the direction of its length by turning it on its upper end as a center to any degree required, and securely fastened in any position to which it may be adjusted.

It also consists in the special devices employed to accomplish this result, and combinations of devices, all of which will be hereinafter described more fully, and distinctly pointed out in the claims.

This improvement is applicable in principle to either flat, square, or round harrow-teeth, though the three forms of teeth require somewhat different devices for attaching them to the bar so as to carry out the main principle of operation. I have therefore shown devices for use with teeth of both kinds, which I will proceed to describe.

In the drawings, A represents a bar of the harrow-frame, to which the teeth are attached. The tooth B is of flat spring metal, coiled at its upper end spirally, so as to leave the extremity at one side free for attachment. The end for a little distance is straight, and its extremity is bent down at right angles to form a short projection or hook, $b$, as shown in Fig. 3 of the drawings. A wedge-shaped plate or block, C, is provided, of somewhat greater width than the tooth, and in it are cut transverse slots $c$, one at each end, adapted to receive the projections $b$ at the end of the tooth. Two holes, $c'$, are also made in the plate to accommodate a staple-hook, D, which embraces the tooth and is extended through the wedge-shaped plate and bar, being held in position by a nut, $d$, turned upon its projecting end or ends, as shown in Fig. 3 of the drawings, thereby fastening the tooth and blocks to the bar.

Now, it is evident that, the wedge-shaped block being immediately underneath the tooth and arranged as shown in the drawings, the pitch of the latter will be determined according to the direction of the inclined face of the block. If, for instance, the block is arranged with its thin edge forward, as shown in Fig. 2, $a$, the lower end of the tooth, will be higher and more nearly perpendicular than when the block is turned directly around, as shown in Fig. 2, $a'$. This wedge-shaped block becomes, therefore, an adjusting device, by means of which the height and pitch of the tooth are regulated, and it is evident that the movement of the tooth in making the adjustment as described will be vibratory about the extreme upper end as a center.

The adjusting-block is slotted at each end, so as to provide for the reception of the hook end of the tooth, whichever end of the block is placed underneath it.

In order to increase the range of adjustment, the number of wedge-shaped blocks may be increased; but the blocks C′, immediately underneath the block C, need not be provided with the transverse slots for the hook end of the tooth.

A slight modification may be made in this attachment by making a single longitudinal slot in the wedge-shaped adjusting-block, as shown in Figs. 9 and 10 of the drawings, in which the adjusting-block E is provided with a slot, e, running lengthwise thereof. In this form of the device a single bolt, F, is used, extending up through the bar and slot in the block, and a hole in the end of the tooth, all the parts being fastened together by a nut on the end. A wedge-shaped washer, f, is also to be used with this device, as shown in Fig. 9 of the drawings.

With this modification a change in the position of the tooth is not only effected, as above described, but it may be raised and lowered bodily by moving the adjusting-block back and forth, the slot therein permitting this movement.

This device may be employed with a round tooth also; but it is not well adapted thereto, as it is difficult to hold the tooth from turning. I therefore prefer a different device when a round tooth, G, is used. In this case I make the projection g to turn outward instead of downward, and provide a bracket, H, which is fastened to the bar A, and has an upright portion, in the rear end of which is a hole, h, for the reception of the projecting end g of the tooth. A slot, h′, is also cut in the upright part of the bracket, the direction of which is in the arc of a circle having its center at the hole h. A bolt, I, is inserted in the slot h′, having a hook, i, at one end, which embraces the tooth, when the latter is connected to the bracket, by inserting the projection g in the hole h, as shown in Figs. 6 and 7 of the drawings. A nut, i′, is turned on the outer end of the bolt, by means of which the latter is drawn up so as to clamp the tooth and hold it in any position.

Now, it is evident that the tooth is capable of a vibratory movement about the point of its attachment as a center, and that this may be effected by simply loosening the bolt I, the circular slot in the bracket permitting the bolt to move back and forth with the vibration of the tooth. It is also evident that this vibration of the tooth will change the height and pitch of the latter, as already described; and that while the means of attachment are somewhat different from those described above for flat teeth, the principle of operation is the same.

Other modes of carrying this principle of construction into effect may be employed; hence I do not desire to limit my invention to the special means of attachment herein shown and described.

Having thus described my invention, what I claim as new, and desire to secure by Letters Patent, is—

1. In a spring-tooth harrow, a tooth-bar, A, in combination with curved teeth attached to the tooth-bars at their upper extremities by a joint which permits the teeth to be vibrated, and a fastening device operating to secure the teeth rigidly in position, whereby a tooth may be adjusted in the direction of its length by turning it on its upper end as a center to any degree required, and securely fastened in any position to which it may be adjusted, substantially as described.

2. The tooth-bar A, in combination with a curved elastic tooth, B, provided with a bent end, b, a wedge-shaped adjusting-block, C, having transverse slots c, and a clamping staple or hook, D, substantially as described.

SAMUEL C. COBB.

Witnesses:
L. L. ROBINSON,
W. A. WEBSTER.